United States Patent
Hulburt et al.

(10) Patent No.: US 7,022,920 B2
(45) Date of Patent: *Apr. 4, 2006

(54) COLLAPSIBLE WEIGHING SCALE

(75) Inventors: Joan Hulburt, 2043 Random Rd., Cleveland, OH (US) 44106; Brian B. Mathewson, Rocky River, OH (US); Cherry A. Bochmann, Bay Village, OH (US); Jesse P. Carlson, Bay Village, OH (US)

(73) Assignee: Joan Hulburt, Cleveland, OH (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/680,796

(22) Filed: Oct. 7, 2003

(65) Prior Publication Data
US 2005/0072604 A1    Apr. 7, 2005

(51) Int. Cl.
*G01G 21/00* (2006.01)
*G01G 21/28* (2006.01)

(52) U.S. Cl. .................................................. 177/126
(58) Field of Classification Search ............... 177/126, 177/127
See application file for complete search history.

(56) References Cited

U.S. PATENT DOCUMENTS

| D274,991 S | * | 8/1984 | Wirtz ........................ D10/92 |
| 4,537,266 A | * | 8/1985 | Greenberg ................. 177/208 |
| 5,234,065 A | | 8/1993 | Schmidt ..................... 177/209 |
| 5,393,935 A | * | 2/1995 | Hasty et al. ................ 177/45 |
| 6,337,446 B1 | * | 1/2002 | Hulburt et al. ............. 177/126 |
| 6,441,323 B1 | * | 8/2002 | Montagnino et al. ....... 177/126 |

FOREIGN PATENT DOCUMENTS

FR    2 811 078    1/2002

* cited by examiner

*Primary Examiner*—Randy W. Gibson
(74) *Attorney, Agent, or Firm*—Fay, Sharpe, Fagan, Minnich & McKee, LLP

(57) ABSTRACT

A collapsible weighing scale includes a support structure and a plurality of platform segments displaceable between extended and collapsed positions. A load sensing apparatus is mounted on the support structure and outputs a signal of the full weight of an associated object on the scale. An output device receives the signal and communicates the full weight sensed by the scale in appropriate units.

39 Claims, 17 Drawing Sheets

COLLAPSIBLE WEIGHING SCALE

The subject invention relates to the art of portable weighing scales and, more particularly, to collapsible weighing scales that can be transformed from a compact or storage configuration into an extended or use configuration.

INCORPORATION BY REFERENCE

Collapsible weighing scales are generally known. For example, such scales are shown and described in Hulburt, et al., U.S. Pat. No. 6,337,446, which is hereby incorporated herein by reference in its entirety.

BACKGROUND OF THE INVENTION

Collapsible scales have been provided heretofore and, generally, take the form of folding scales which seem to most often trade width for height providing no significant advantage over a comparably sized non-folding scale with regard to portability. For example, in Schmidt, U.S. Pat. No. 5,234,065, the scale can be folded up into one-quarter its original width. However, in doing so, the original thickness is quadrupled. As such, the overall reduction in volume is minimal and the corresponding benefit, with regard to portability, is significantly reduced.

Other collapsible scales, that provide a significant reduction in volume when in compact or collapsed form, are shown in Hulburt, et al., U.S. Pat. No. 6,337,446 (Hulburt '446 hereinafter). However, these scales, too, have certain disadvantages. In particular, the scales disclosed in Hulburt can be complicated or inconvenient to deploy from a compact or collapsed arrangement. Often, these scales require multiple steps to expand from the compact configuration to an extended configuration suitable for use as a weighing scale.

As such, it is considered desirable to develop new and improved collapsible scales having a reduced volume when in a compact configuration and which are expandable to a fully deployed configuration in a reduced number of steps or motions.

SUMMARY OF THE INVENTION

A collapsible scale in accordance with the present invention is provided that includes a support structure having a first support member and a second support member connected to and displaceable relative to the first support member between a collapsed position and an extended position. A plurality of platform segments is supported on the support structure forming a platform. The plurality of platform segments is displaceable between a collapsed position, in which at least some of the platform segments are displaced from a plane of the first and second support members, and an extended position, in which all of the platform segments are located in the plane of the first and second support members. Each of the support members and the platform segments extend in generally transverse relation to the direction in which the support structure extends and collapses. A load sensing apparatus is mounted to the support structure and is adapted to provide an output signal of the full weight of an associated object. An output device for communicating the full weight of the associated object is in electrical communication with the load sensing apparatus and receives the output signal there from.

Additionally, a collapsible weighing scale is provided that includes a support structure having a base member and a plurality of support members pivotally mounted on the base member. The support members are displaceable relative to the base member between collapsed and extended positions. In the collapsed position, the support members extend in generally aligned relation to the base member. In the extended position, the support members extend in generally transverse relation to the base member with at least one of the support members projecting from opposing sides of the base member. A plurality of platform segments is supported on the support structure and has respective collapsed and extended positions that correspond to the collapsed and extended positions of the support structure. A load sensing apparatus is mounted to the support structure and provides an output signal of the full weight of an associated object. An output device for communicating the full weight of the associated object is in electrical communication with the load sensing apparatus and receives the output signal therefrom.

Furthermore, a collapsible weighing scale is provided that includes a support structure displaceable between a collapsed position and an extended position in a single action. The support structure includes a base member, a plurality of support members pivotally mounted on the base member, an actuating member, and a linkage arrangement interconnecting the actuating member and at least one of the plurality of support members. In the collapsed position, the support members extend in generally aligned relation to the base member. In the extended position, the support members extend in generally transverse relation to the base member with at least one of the support members projecting from each of the opposing sides thereof. A plurality of platform segments is mounted on the support structure and has respective collapsed and extended positions corresponding to the collapsed and extended positions of the support structure. A load sensing apparatus is supported on the support structure and provides an output signal of the full weight of an associated object. An output device for communicating the full weight of the associated object is in electrical communication with the load sensing apparatus and receives the output signal therefrom.

Further yet, a collapsible weighing scale is provided that includes a support structure having first and second support members and a plurality of platform segments interconnected with one another and supported by the first and second support members in a deployed orientation thereof. Each of the platform segments is pivotally interconnected to an adjacent platform segment by a pivotal joint, and each of the platform segments includes a male joint portion and a female joint portion. A load sensing apparatus is mounted to the support structure and is adapted to provide an output signal of the full weight of an associated object. An output device, for communicating the full weight of the associated object, is in electrical communication with the load sensing apparatus and receives the output signal therefrom.

BRIEF DESCRIPTION OF THE DRAWINGS

The invention may take form in certain components and structures, preferred embodiments of which are illustrated in the accompanying drawings.

DETAILED DESCRIPTION OF THE PREFERRED EMBODIMENTS

Figure 1:
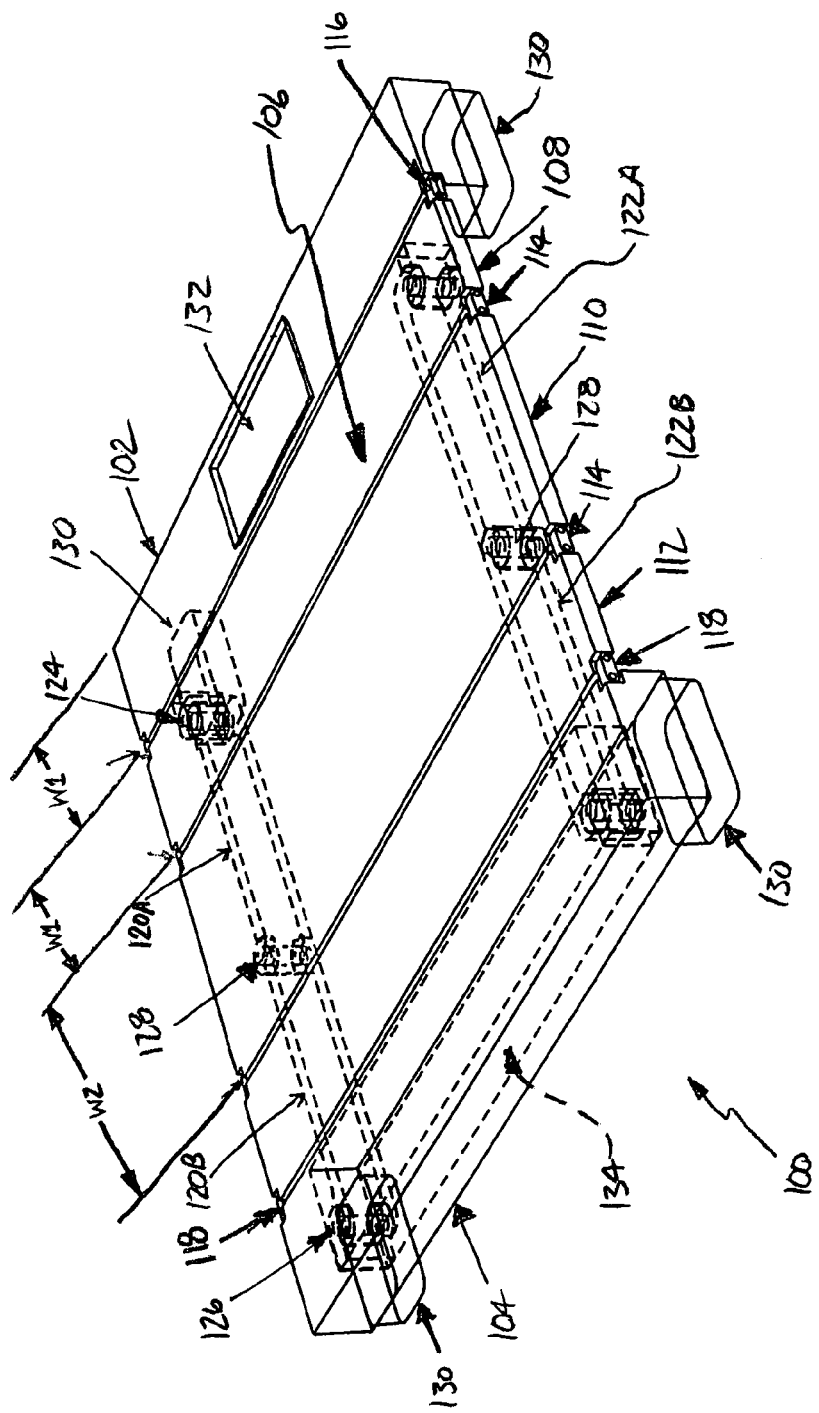
FIG. 1 is a perspective view of a first embodiment of a collapsible weighing scale in accordance with the present invention, shown in an extended position.
Figure 2:
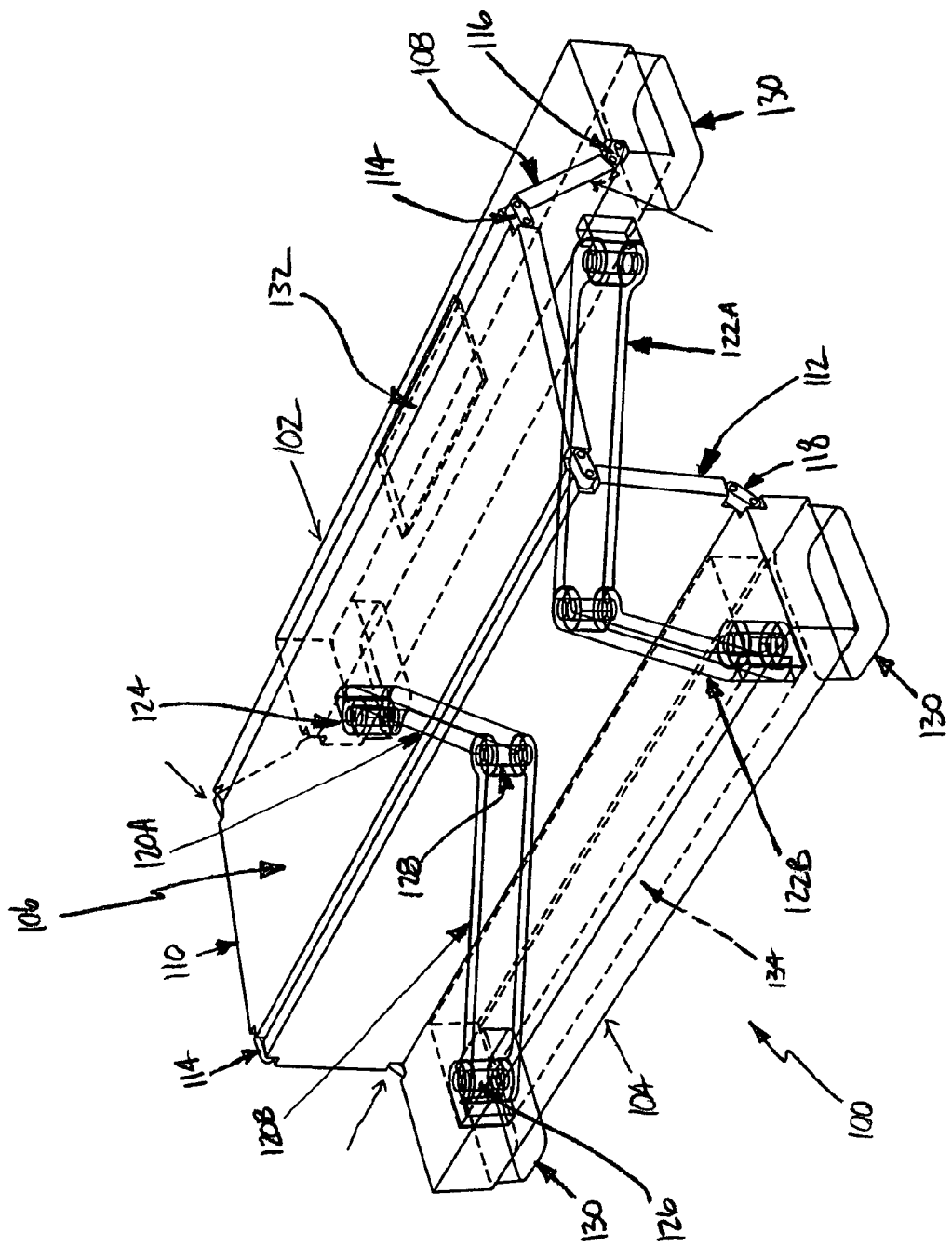
FIG. 2 is a perspective view of the collapsible weighing scale of FIG. 1 shown in a partially collapsed position.
Figure 3:
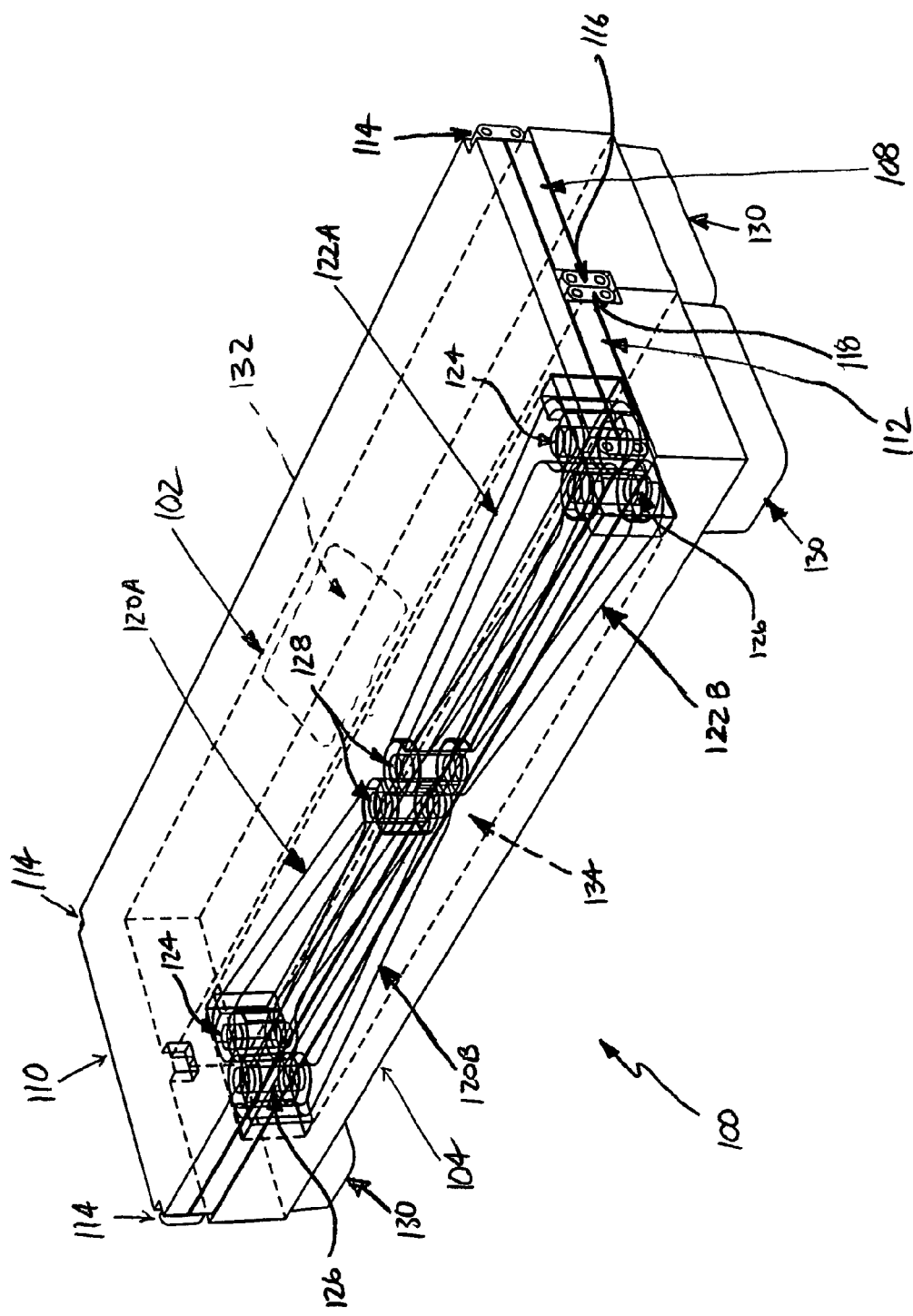
FIG. 3 is a perspective view of the collapsible weighing scale of FIG. 1 shown in a fully collapsed position.

Referring now in greater detail to the drawings, wherein the showings are for the purpose of illustrating preferred embodiments of the invention only and not for the purpose of limiting the invention, FIGS. 1–3 illustrate a first embodiment of the present invention. It includes a collapsible weighing scale 100 having a support structure that includes a first support member 102 and a second support member 104. A top surface or platform 106 is provided on scale 100 and is formed from platform segments 108, 110 and 112, along with support members 102 and 104. The platform segments are connected to one another by conventional hinges 114. Platform segment 108 is connected to support member 102 by known hinges 116, and platform segment 112 is connected to support member 104 by similar hinges 118. It will be appreciated, however, that platform 106 can be formed by any suitable number of platform segments of any suitable width. For example, support members 102 and 104 and platform segments 108 and 112 can each have a first width dimension W1 of about 2 inches, and platform segment 110 can have a second width dimension W2 that is approximately twice dimension W1 or about 4 inches. It will be further appreciated that the platform segments can be connected or attached to one another and to support members 102 and 104 by any suitable arrangement.

A pair of spaced-apart support beams 120 and 122 extends between support members 102 and 104. Each of the support beams includes a first portion 120A, 122A pivotally attached to support member 102 by a conventional hinge and pin arrangement 124, and a second portion 120B, 122B pivotally attached to support member 104 by a conventional hinge and pin arrangement 126. The two portions of each respective support beam are hingedly connected by any suitable arrangement, such as a known hinge and pin arrangement 128. Feet 130 are supported on support members 102 and 104 and are suitable for contacting and conveying the load to be weighed onto a floor, table or other suitable flat surface. An output device suitable for communicating the full weight of the associated object, such as display 132, for example, is provided on support member 102 for communicating the total weight sensed by the scale.

Scale 100 is shown in FIG. 1 in a deployed, functional or use condition. In this configuration, the scale operates by sensing a load placed onto platform 106 and displaying the total weight of the load on display 132. Platform 106 is formed in part by support members 102 and 104 and by support segments 108, 110 and 112 that are in turn supported on support beams 120 and 122 forming a stable, flat surface to support the load. The load is transferred through support segments 108, 110 and 112 onto support beams 120 and 122 and thereafter to support members 102 and 104. The total load is therefore shared by both support members 102 and 104 which are each supported by two feet 130. The feet contact and convey the load onto the floor. The load is measured by known electronic load sensors (not shown) within the scale. A load sensor can be installed on each foot or between each foot and an associated support member to create an electronic signal that can be directly correlated to the load sensed by each foot. By summing the loads seen at each of the feet and converting that signal into appropriate units, the total weight sensed by the scale can be determined and displayed or otherwise communicated.

FIGS. 1–3, when taken together show scale 100 moving from a fully extended or use condition into a fully collapsed or storage configuration. As first and second support members 102 and 104 are pushed together, the three platform segments 108, 110 and 112 will be displaced upward out of the plane formed as platform 106 by pivoting at hinged connections 114, 116 and/or 118. As support members 102 and 104 continue to be pushed together, hinged connections 116 and 118 respectively cause platform segments 108 and 112 to pivot at hinged connections 114 and rotate into position subjacent platform segment 110. This action continues through the intermediate position shown in FIG. 2 until the fully collapsed configuration as shown in FIG. 3 is reached. As support members 102 and 104 are pushed together, support beams 120 and 122 are also displaced such that portions A and B pivot relative to one another about hinge and pin arrangement 128 and relative to support members 102 and 104 respectively about hinge and pin arrangements 124 and 126. Portions A and B of support beams 120 and 122 continue to fold against one another as the support members are pushed together until the scale is fully collapsed and portions A and B are respectively received within a pocket 134 respectively within support members 102 and 104. Once in the stored configuration, the scale can be held together in any suitable manner, such as by a reclosable fastener or by being placed in an enclosure or bag to prevent inadvertent deployment of the scale.

It will be appreciated that the extension of the scale can be completed in one action. As support members 102 and 104 are pulled apart, the platform segments and support beams unfold and extend relative to one another until a fully extended position is reached.

Figure 4:
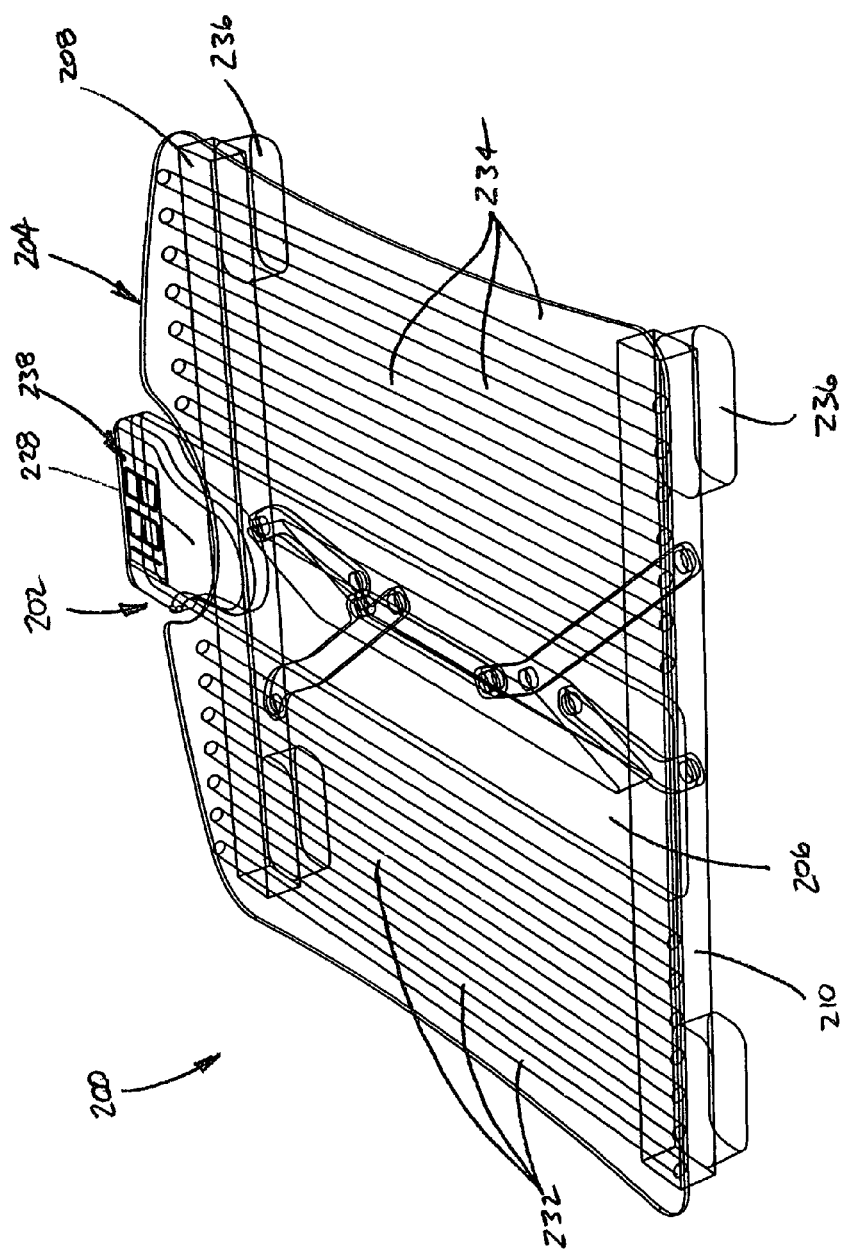
FIG. 4 is a perspective view of a second embodiment of a collapsible weighing scale in accordance with the present invention shown in an extended position.
Figure 5:
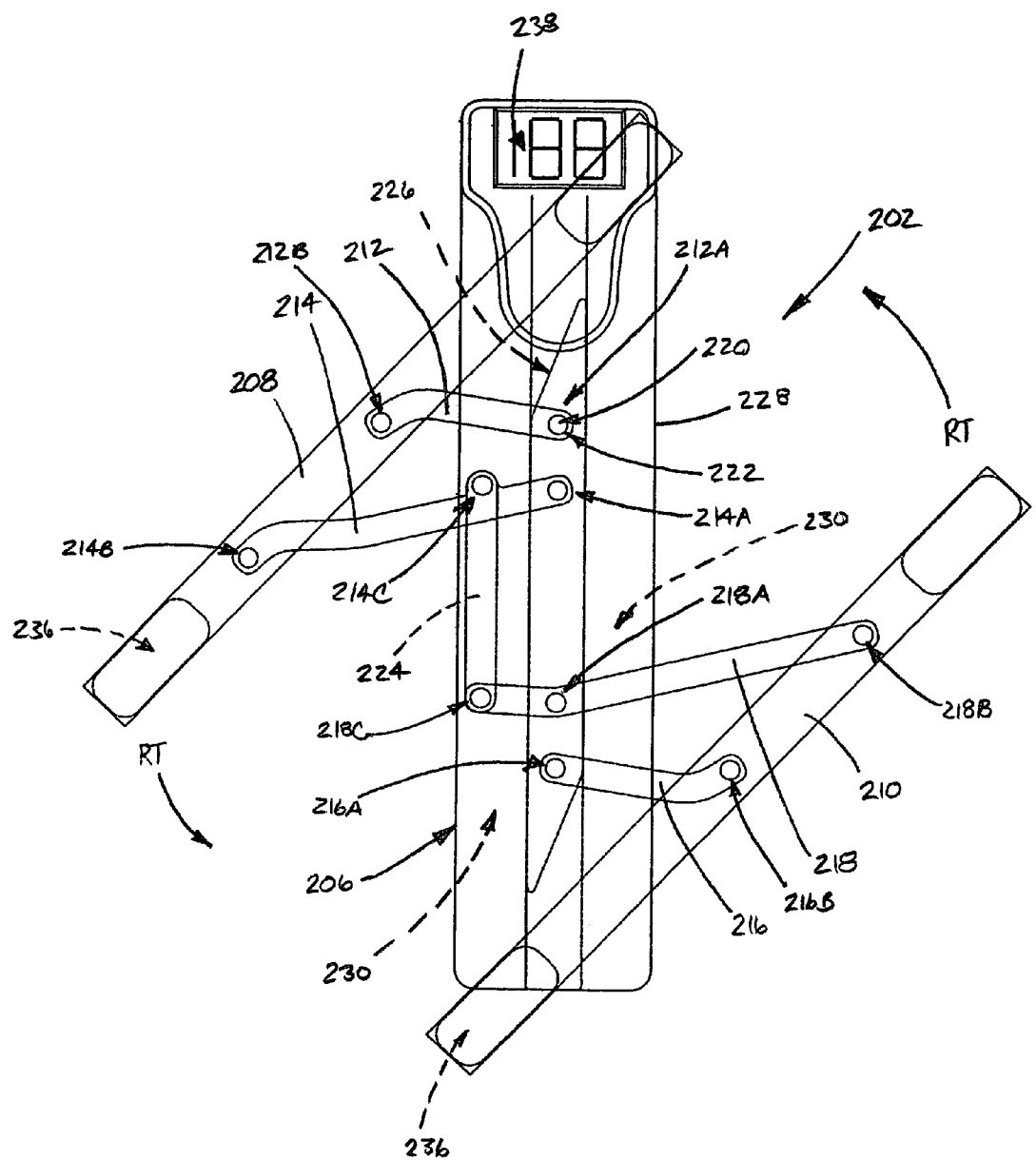
FIG. 5 is a top plan view of the support structure of the collapsible weighing scale of FIG. 4 shown in a partially collapsed position.
Figure 6:
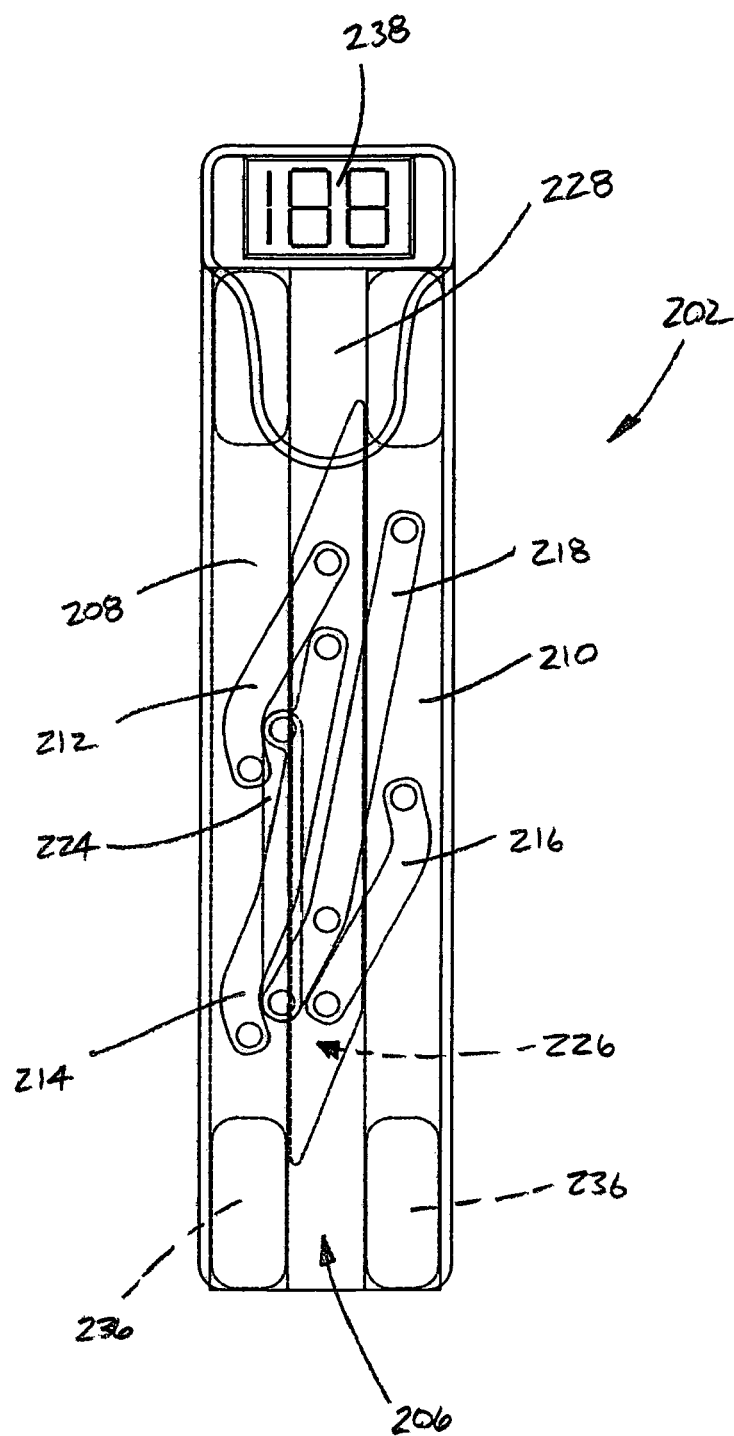
FIG. 6 is a top plan view of the support structure of FIG. 4 shown in a fully collapsed position.

A collapsible weighing scale 200 in accordance with a second embodiment of the present invention is shown in FIGS. 4, 5 and 6. Scale 200 includes a support structure 202 and a platform 204 mounted on the support structure. In FIG. 4, scale 200 is shown in a deployed configuration suitable for determining and outputting the full weight of an associated object.

Support structure 202 includes a central body or base member 206 and support members 208 and 210 pivotally mounted on the base member. As can be seen in FIG. 5, support member 208 is connected to base member 206 by pivot arms 212 and 214. Similarly, support member 210 is connected to the base member by pivot arms 216 and 218. Each of the pivot members are connected to base member 206 at pivot points "A" and are connected to the respective support member at pivot points "B". Pivot points 212A, 212B, 214A, 214B, 216A, 216B, 218A and 218B can be formed by any suitable pivotable connection as are well known in the art, such as a post 220 extending from the base member or one of the support members engaging a hole 222 extending through one of the pivot members at one of the pivot points, for example. A linking member 224 is pivotally interconnected between pivot arms 214 and 218 at pivot points 214C and 218C. Pivot point 214C is disposed along pivot member 214 between pivot points 214A and 214B thereof. Pivot point 218C is disposed along pivot member 218 adjacent pivot point 218A opposite from pivot point 218B. It will be appreciated that linking member 224 can be pivotally attached to the respective pivot members in any suitable manner, such as by using a post and hole arrangement as discussed above, for example.

A longitudinal projection 226 extends downwardly from a top surface 228 of base member 206, and forms longitudinally extending recesses 230 (FIG. 5) below the top surface that extend along opposing sides of projection 226. In a deployed or extended position of support structure 202, support members 208 and 210 oriented generally transverse base member 206 and extend outwardly from both sides thereof. In a retracted or collapsed position of the support structure, support members 208 and 210 are each respectively received beneath top surface 228 within a different one of recesses 230, as shown in FIG. 6.

When taken together, FIGS. 4–6 illustrate scale 200 moving from the extended position to the collapsed position. During such motion, support members 208 and 210 are displaced relative to base member 206, as indicated by arrow RT in FIG. 5. The support members pivot and rotate relative to the base member, due to the action of the respective pivot arms, such that upon reaching the collapsed position, the support members are substantially aligned with the base member. Linking member 224 acts to ensure that the pivot arms and, therefore, the support members, are displaced together. Furthermore, due to the interconnection of linking member 224 with pivot members 214 and 218, displacement of one support member induces simultaneous displacement of the pivot arms and the other support member. The support members move from the collapsed position to an extended position in a substantially similar manner but in the opposing direction. As such, the support structure can be substantially deployed or collapsed in one movement.

Scale 200 also includes a plurality of platform segments, such as rods 232, for example, and a flexible material 234, such as a woven or polymeric material, for example, interconnecting the platform segments to form platform 204, as shown in FIG. 4. The platform is secured to the support structure in a suitable manner, such as using a fastener (not shown), for example. In the deployed configuration, platform 204 extends outwardly from base member 206 such that rods 232 are supported on the support members forming a substantially horizontal surface for receiving the associated object to be weighed. In the collapsed configuration, the platform can be wrapped around the support structure and secured thereto in a suitable manner, such as using a recloseable fastener (not shown), for example.

Scale 200 includes a foot 236 on each end of each support member 208 and 210. Feet 236 are suitable for contacting and conveying the load of the associated object to a floor or other surface. The total load of the associated object is conveyed to the feet from the support members and, as such, is shared by each of feet 236. The load is measured by suitable known electronic load sensors (not shown). The load sensors can be formed within each foot or installed between the support member and each foot. The load sensors create an electronic signal that can be directly correlated to the load sensed by each foot. Using suitable electronics well known to those skilled in the art, the loads seen at each foot are summed and converted into appropriate units representing the total load. A signal correlated to the total load is output to a suitable output device, such as a display 238, for example.

Figure 7:
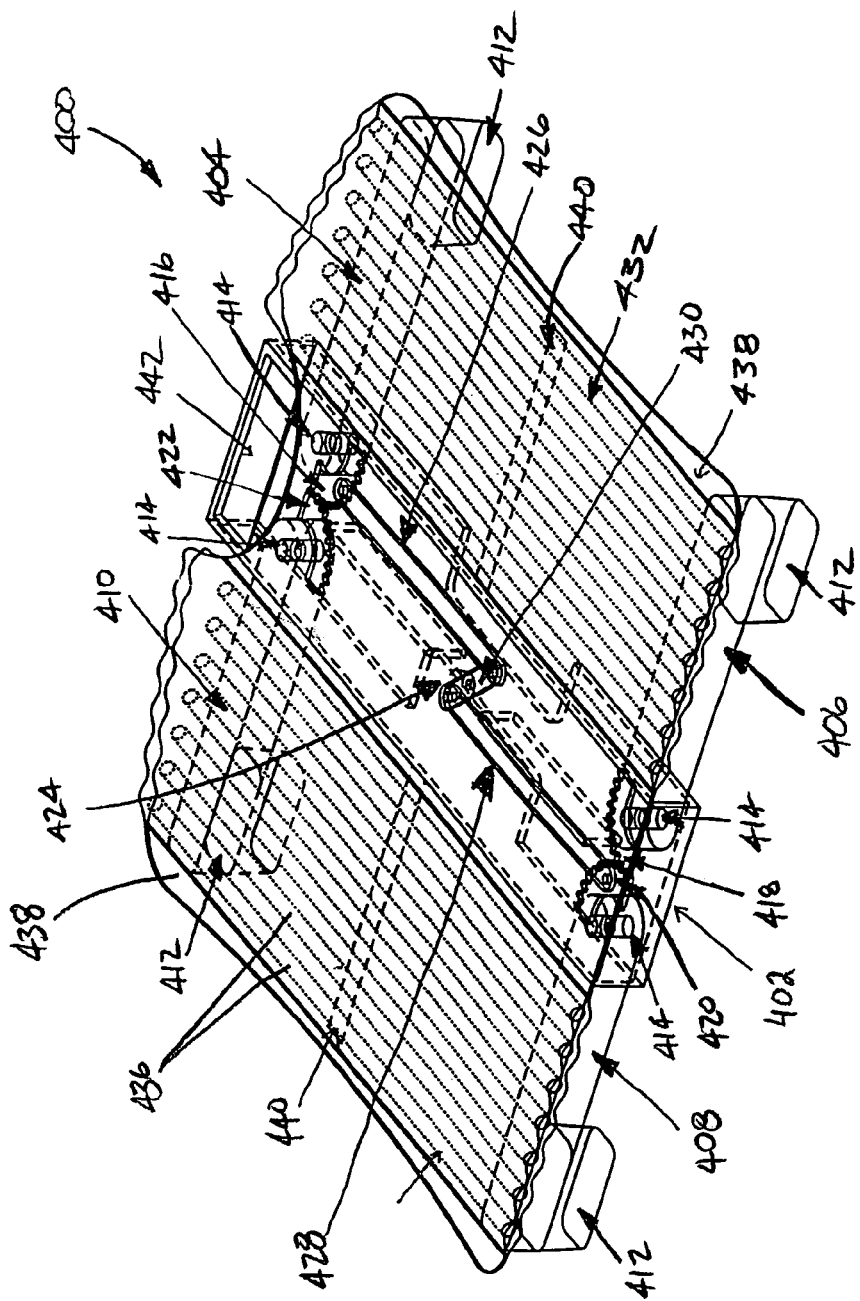
FIG. 7 is a perspective view of a third embodiment of a collapsible weighing scale in accordance with the present invention shown in an extended position.
Figure 8:
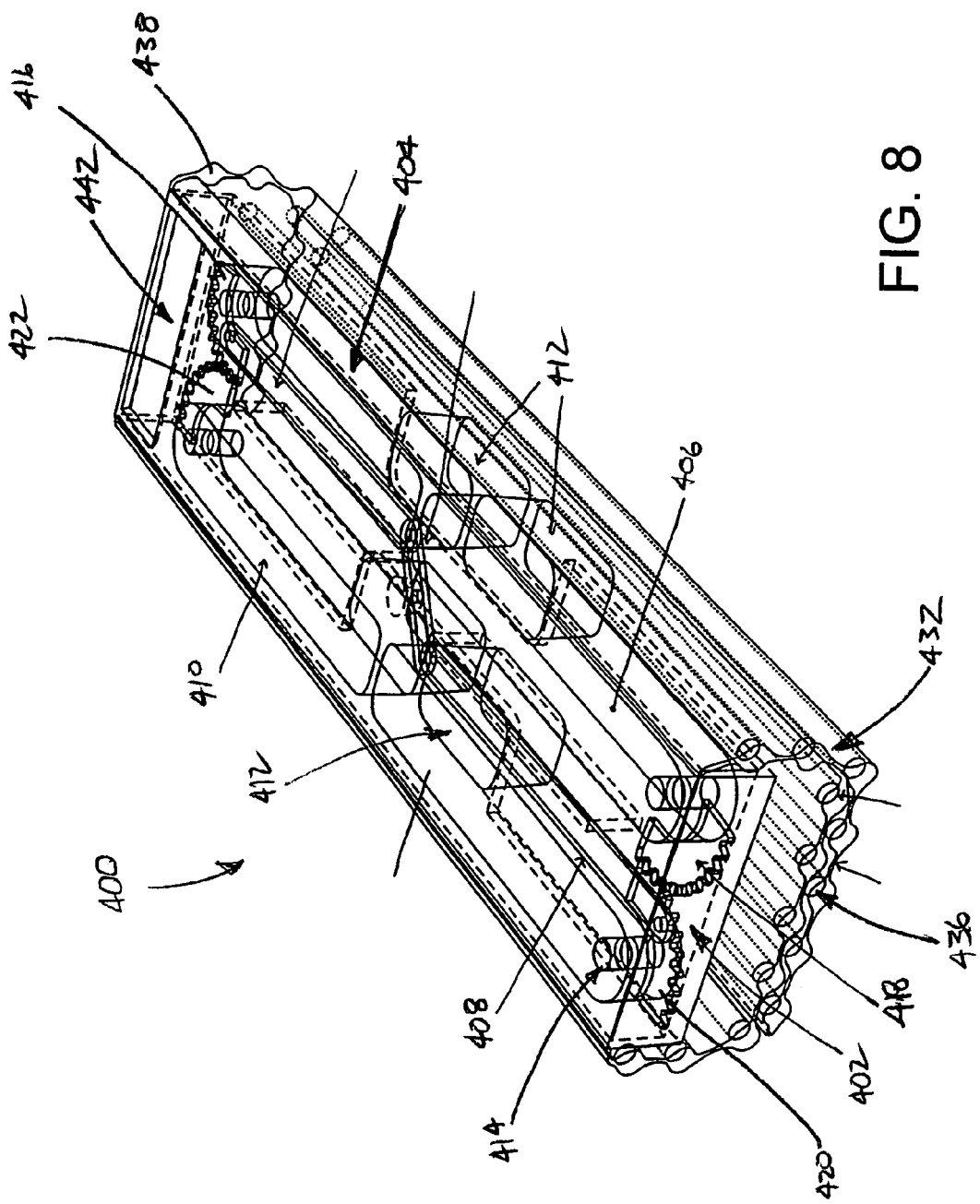
FIG. 8 is a perspective view of the collapsible weighing scale of FIG. 7 shown in a collapsed position.
Figure 9:
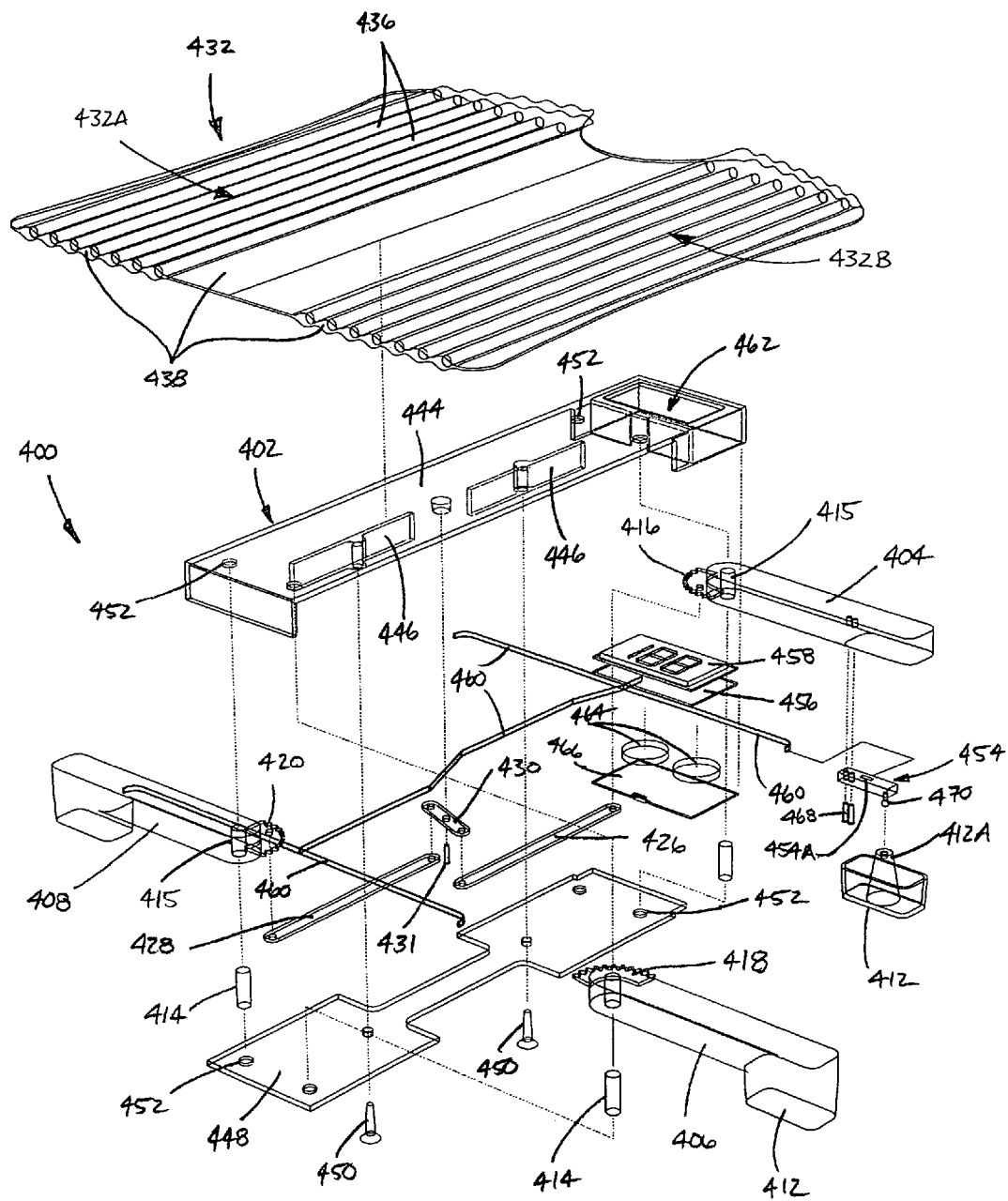
FIG. 9 is an exploded perspective view of the collapsible weighing scale shown in FIG. 7.

Still another collapsible weighing scale 400 in accordance with the present invention is shown in FIGS. 7, 8 and 9. Scale 400 includes a support structure that has an elongated base member or central body 402 and legs 404, 406, 408 and 410 (leg 410 is not shown in FIG. 9) that are pivotally mounted on central body 402. A foot 412 is mounted on each of the legs for engaging a floor, table or other flat subjacent surface. Each of the legs is mounted on central body 402 by a suitable pivot arrangement, such as by a pivot post 414 supported on central body 402 that engages a pivot hole 415 (FIG. 9) in each of the legs. Gear segments 416, 418, 420 and 422 are each respectively defined on legs 404, 406, 408 and 410. Gear segment 416 of leg 404 interengages gear segment 422 of leg 410 such that pivotal rotation of one leg between a retracted and an extend position results in simultaneous displacement of the other leg in the opposite direction. Similarly, gear segments 418 and 420 of legs 406 and 408, respectively, interengage one another and likewise move simultaneously in opposite directions to one another as one of the legs is displaced. As such, when one of legs 404 and 410 is pivotally displaced from a retracted position to a deployed position, or vice versa, the other leg will likewise be repositioned. Legs 406 and 408 are configured and operate in the same manner.

Gear segments 416 and 420 are connected by a linkage arrangement 424 that extends therebetween and includes a first member 426, a second member 428 and a pivot member 430 that is pivotally supported along central body 402 in a suitable manner, such as by a pivot post 431 secured to central body 402, for example. First member 426 extends between gear segment 426 and one end of pivot member 430. Second member 428 extends between gear segment 420 and the opposing end of pivot member 430. First and second members 426 and 428 are pivotally connected, such as by using a suitable post and hole arrangement, for example, between a respective gear segment and the pivot member such that the rotational displacement of gear segment 416 around pivot post 414 is reacted to gear segment 420 through linkage arrangement 424 causing rotational displacement of gear segment 420. As such, each of legs 404, 406, 408 and 410 are pivotally linked to one another so that rotational displacement of one about an associated pivot post induces a corresponding rotational displacement of each of the remaining legs.

Central body 402 includes a top wall 444 and longitudinal projections 446 extending downwardly from top wall 444. Additional projections, bosses, holes and/or other features can also be provided on central body 402, as desired. A bottom wall 448 is secured to central body 402 in a suitable manner, such as by using fasteners 450, for example. Top wall 444 and bottom wall 448 each include holes 452 for receiving and retaining each of pivot posts 414, such as by using a press fit, for example. However, it will be appreciated that any suitable arrangement for retaining the pivot posts can be used. Longitudinally extending cavities (not numbered) are formed along opposing sides of projections 446 between top wall 444 and bottom wall 448. In the retracted or collapsed configuration, legs 404, 406, 408 and 410 are received within one of the respective cavities to achieve the compact form of the support structure.

Scale 400 also includes a platform 432 supported on the support structure and suitable for receiving an associated object to be weighed. Platform 432 is secured to central body 402 in a suitable manner and in an extended position, shown in FIGS. 7 and 9, is supported on legs 404, 406, 408 and 410. Platform 432 includes a plurality of platform segments, such as rods 436, for example. The platform segments are interconnected by a suitable flexible material 438, such as a woven material or a polymeric film, for example. Platform 432 can optionally be formed from two portions that are separately secured to the central body. Scale 400 also optionally includes springs 440 extending from central body 402 that can be used to support platform 432 to keep the extended portions thereof out of the way during deployment and retraction of legs 404, 406, 408 and 410. Once the legs are retracted and stowed within central body 402, as shown in FIG. 8, platform portions 432A and 432B (FIG. 9) can be folded or otherwise formed around the central body with sufficient force to overcome the bias of springs 440, if such springs are included. The platform can be retained in the collapsed position in any suitable manner, such as by a removable strap (not shown), for example.

Each embodiment herein of a scale in accordance with the present invention, including scales 100, 200 and 400 and scales 600 and 700 discussed hereinafter, includes a suitable load sensing apparatus and an output device. The load sensing apparatus is preferably adapted to output a signal corresponding to the total weight of the associated object to the output device that, in turn, communicates the total weight, either visually, audibly or both, to the user. One example of a suitable load sensing apparatus is shown in and hereinafter discussed with reference to FIG. 9, which illustrates scale 400. However, it is to be specifically understood that this is merely one example of a load sensing apparatus and that any suitable load sensing apparatus or arrangement can be used without departing from the principles of the present invention. What's more, it will be further understood that this or any other suitable load sensing apparatus can be used in association with any suitable collapsible scale including, but not limited to, those embodied, shown and/or described herein.

One suitable load sensing apparatus is shown in FIG. 9 and includes a plurality of load cells in electrical communication with suitable electronic circuitry 456. It will be appreciated that load cells are well known and commonly used. As such, any suitable load cell can be used, including a shear beam load cell 454, for example. Load cells 454 are secured to each leg in a suitable manner, such as by using fasteners 468, for example. Each foot 412 is secured to the associated load cell through a self-leveling joint 412A by a fastener 470. Each load cell outputs a signal correlated to the portion of the total load supported by its associated foot. The signal from each load cell is communicated to the electronic circuitry, which sums or otherwise determines the total load based on the individual signals. Preferably, the electronic circuitry includes a microprocessor (not shown) or other suitable device for determining the total load of the associated object and outputting a signal to the output device, such as display 458, for example, that is correlated to the total weight of the object. Load cells 454 can include one or more strain gauges 454A that are in electrical communication with circuitry 456 through flexible wires 460. Central body 402 includes a chamber 462 suitable for housing the electronic circuitry and display. The load sensing apparatus is powered by one or more batteries 464 that are secured with chamber 462 by a cover 466. Display 458 is preferably positioned within chamber 462 such that it is visible from above the scale.

In operation, the portion of the total load that is sensed by each foot is communicated to the electronic circuitry as a signal that is directly correlated to that portion of the load. The electronic circuitry sums the load from each foot, or otherwise determines the total load, and outputs a signal correlated to the total weight of the object to the output device.

Figure 10:
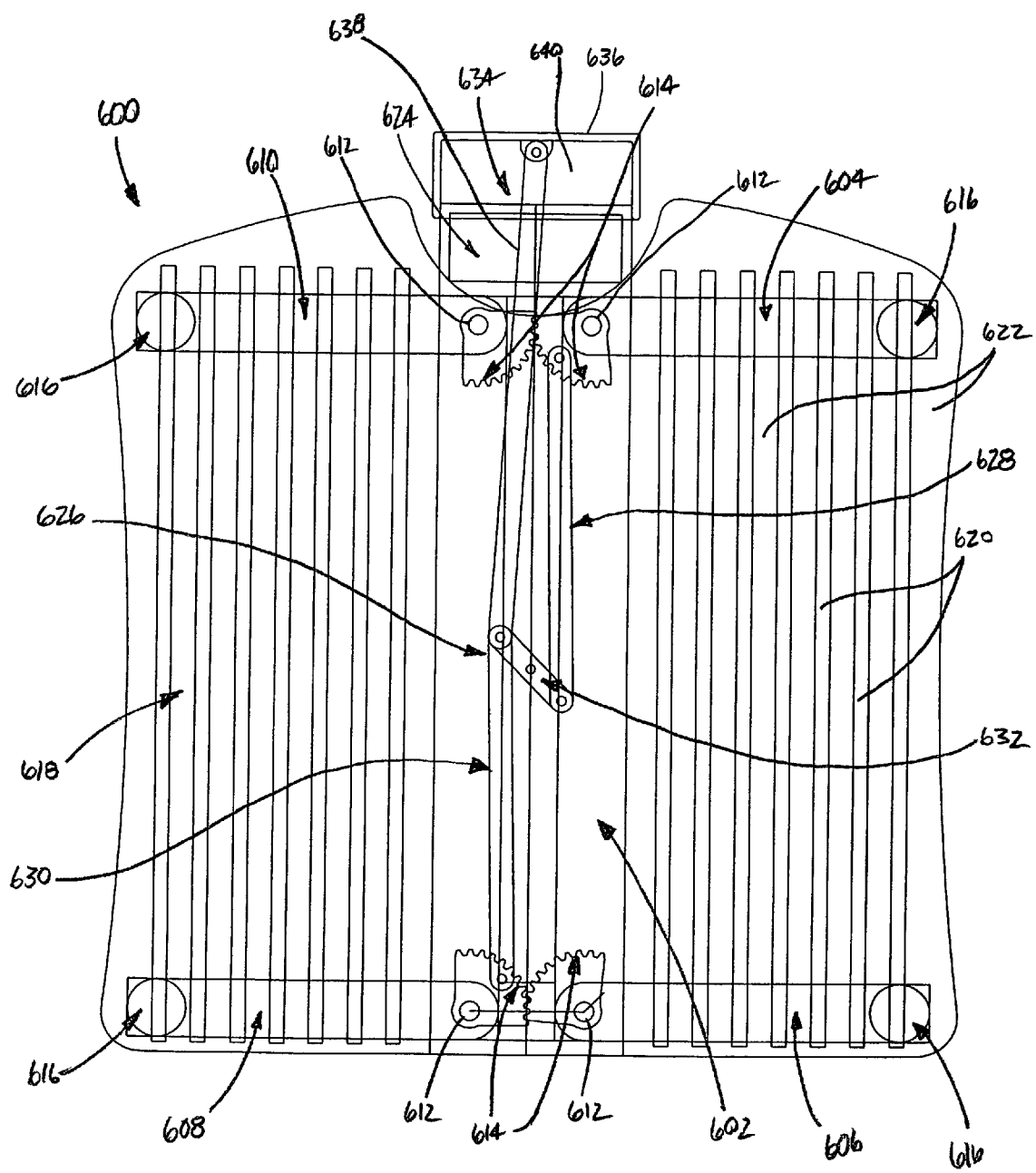
FIG. 10 is a top plan view of a fourth embodiment of a collapsible weighing scale in accordance with the present invention shown in an extended position.
Figure 11:
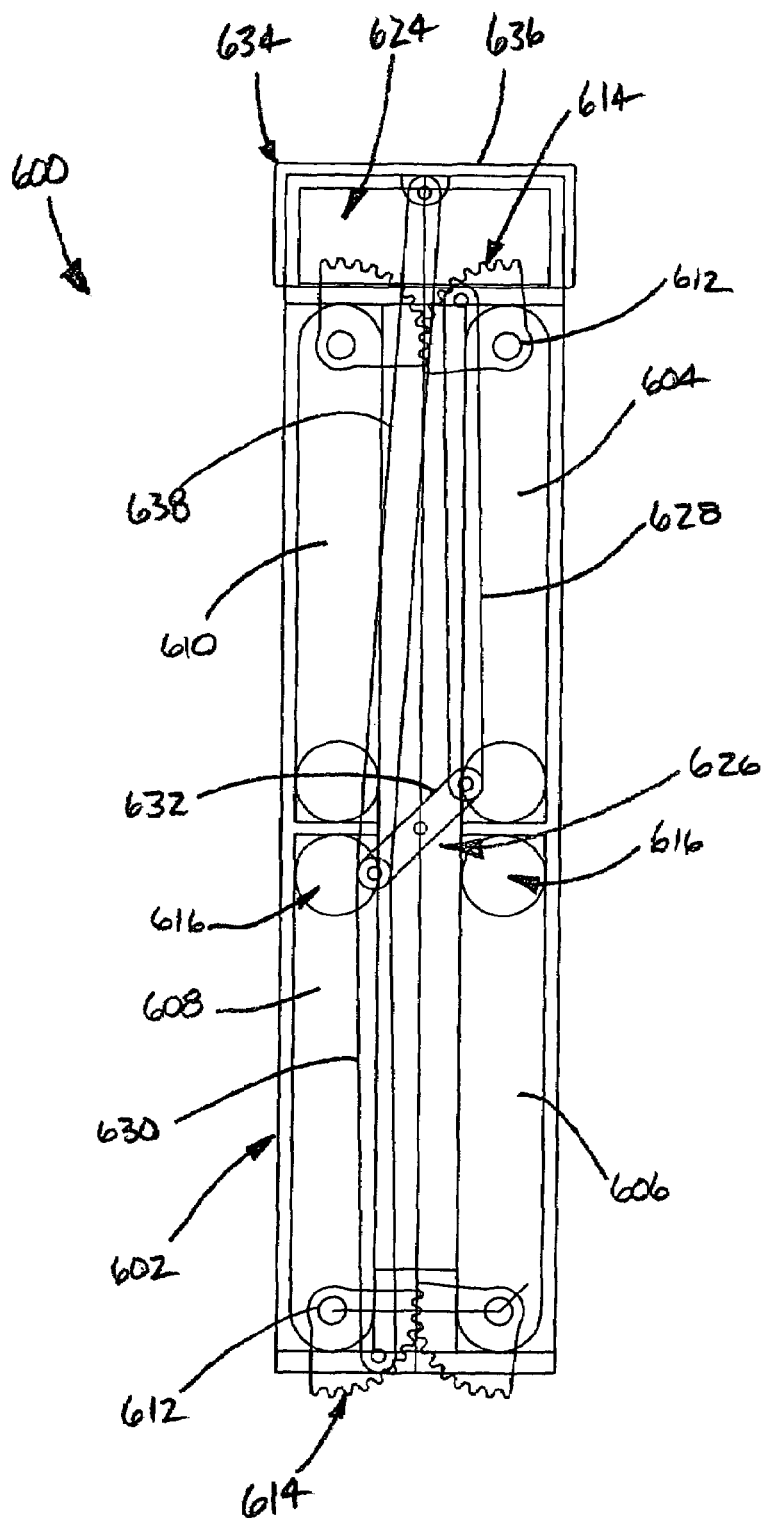
FIG. 11 is a top plan view of the support structure of the collapsible weighing scale in FIG. 10 shown in a collapsed position.

Still another embodiment of a collapsible weighing scale 600 in accordance with the present invention is shown in FIGS. 10 and 11. It will be appreciated that scale 600 is substantially similar to collapsible weighing scale 400 shown in and described with regard to FIGS. 7, 8 and 9. Collapsible scale 600 includes a support structure having an elongated base member or central body 602 and legs 604, 606, 608 and 610 that are rotatably supported on body 602. Each leg has pivot hole 612 at one end thereof and is suitably supported on central body 602 for rotational movement about the pivot hole, such as by a pin (not shown), for example.

A gear segment 614 is associated with each leg and is spaced radially outwardly from pivot hole 612. It will be appreciated that gear segments 614 are rotatably fixed relative to the associated leg such that rotation of the gear segment about pivot hole 612 causes the associated leg to rotate with the gear segment. A foot 616 is supported at a distal end of each leg opposite the pivot hole therein.

An electronic load sensor is installed on each foot or between each foot and the associated leg and creates an electronic signal directly correlated to a load sensed by the foot. The signals from each load sensor are summed and a total load signal is transmitted to display 624, which in turn outputs the total load in appropriate units. A platform 618 extends from central body 602 and includes a plurality of platform segments, such as elongated rods 620, for example. A flexible material 622 interconnects segments 620 and can be formed from any suitable material or combination of materials, such as a woven material or a polymeric film, for example.

In the extended or deployed position shown in FIG. 10, legs 604, 606, 608 and 610 extend generally transverse elongated central body 602. Platform segments 620 extend generally along central body 602 and are supported between the associated legs forming a generally flat platform for receiving the load.

A linkage arrangement 626 is supported on central body 602 and includes a first member 628, a second member 630 and a pivot member 632. The first and second members 628 and 630 extend between two different gear segments 614 and opposing ends of pivot member 632, which is pivotally supported on central body 602. An actuator 634 is also provided on scale 600 and includes an actuator handle 636 and a connector member 638 extending between handle 636 and pivot member 632. Actuator handle 636 is slidably supported on central body 602 adjacent display 624 and includes a cover wall 640 that extends over and protects the display when scale 600 is in a collapsed position. It will be appreciated that handle 636 moves between an extend position, shown in FIG. 10, in which the legs of scale 600 are extended or deployed, and a retracted position, shown in FIG. 11, in which the legs of 600 are retracted into a collapsed position.

In moving between the extended and retracted positions, handle 636 forces connector member 638 to rotate pivot member 632 primarily due to the translation of connector member 638. Rotation of pivot member 632 primarily causes translation of first and second members 628 and 630, which in turn rotate the gear segments associated with the first and second members. As these associated gear segments rotate, the corresponding interengaging gear segments likewise rotate and the associated legs move from the extended position shown in FIG. 10 to the collapsed position shown in FIG. 11. As such, the movement of handle 636 from the extended to the retracted position results in all four legs moving from the deployed position shown in FIG. 10 to the collapsed position shown in FIG. 11 in one movement. The scale moves from the collapsed to the deployed position by displacing the handle in the opposite manner.

Figure 12:
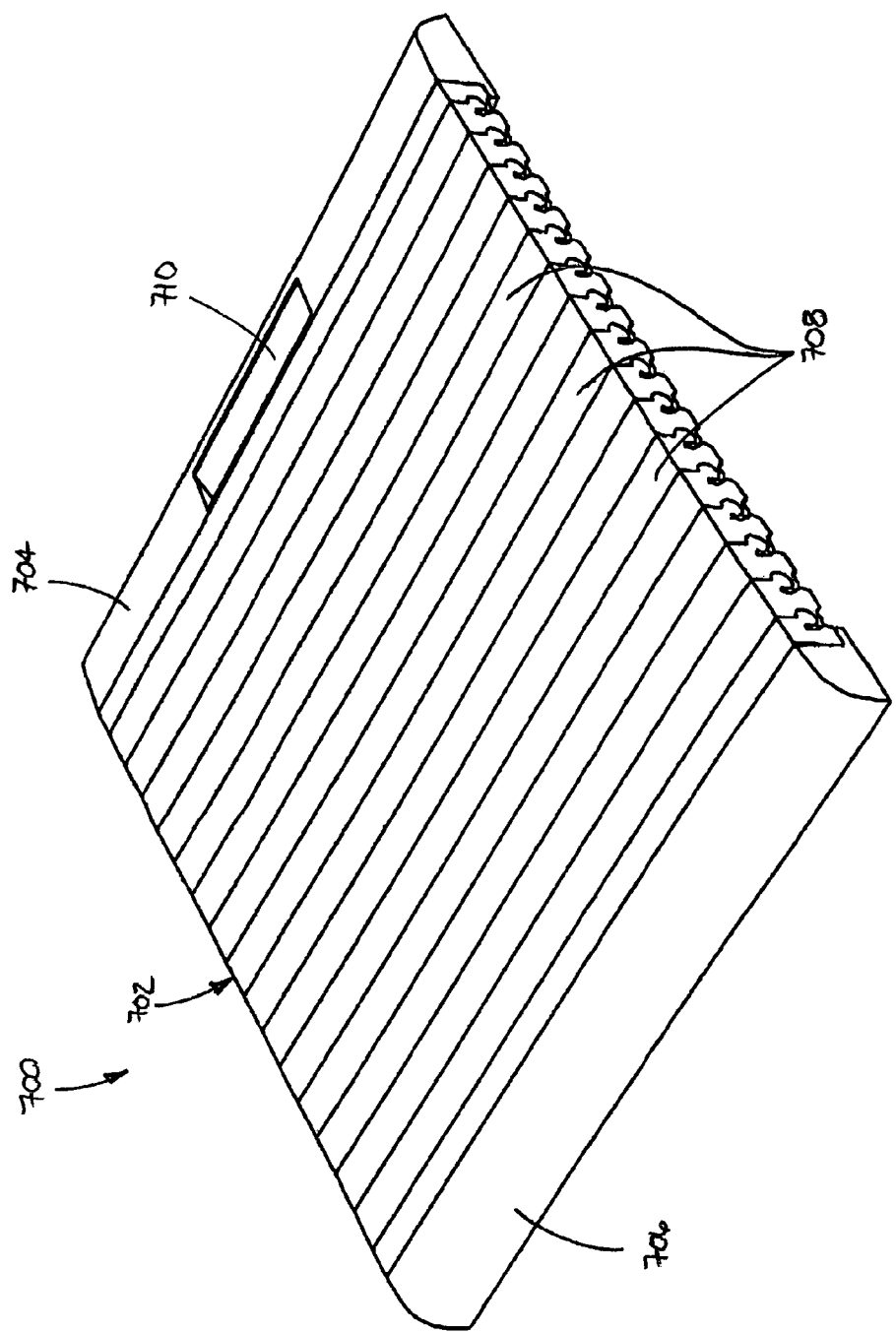
FIG. 12 is a perspective view of a fifth embodiment of a collapsible weighing scale in accordance with the present invention shown in an extended position.

Yet another embodiment of a collapsible weighing scale 700 is shown in and described with reference to FIGS. 12–17. Scale 700 includes a support structure or platform 702 that is formed from first and second support members 704 and 706, and a plurality of platform segments 708 interconnected between the support members. Additionally, scale 700 includes a load sensing apparatus (not shown) and an output device, such as a display 710, for example. The load sensing apparatus is mounted on the support structure and is suitable for providing an output signal of the full weight of an associated object. The output device, such as display 710, is in electrical communication with the load sensing apparatus and receives the output signal therefrom. Display 710 is shown in FIG. 12 as being recessed into first support member 704.

Figure 13:
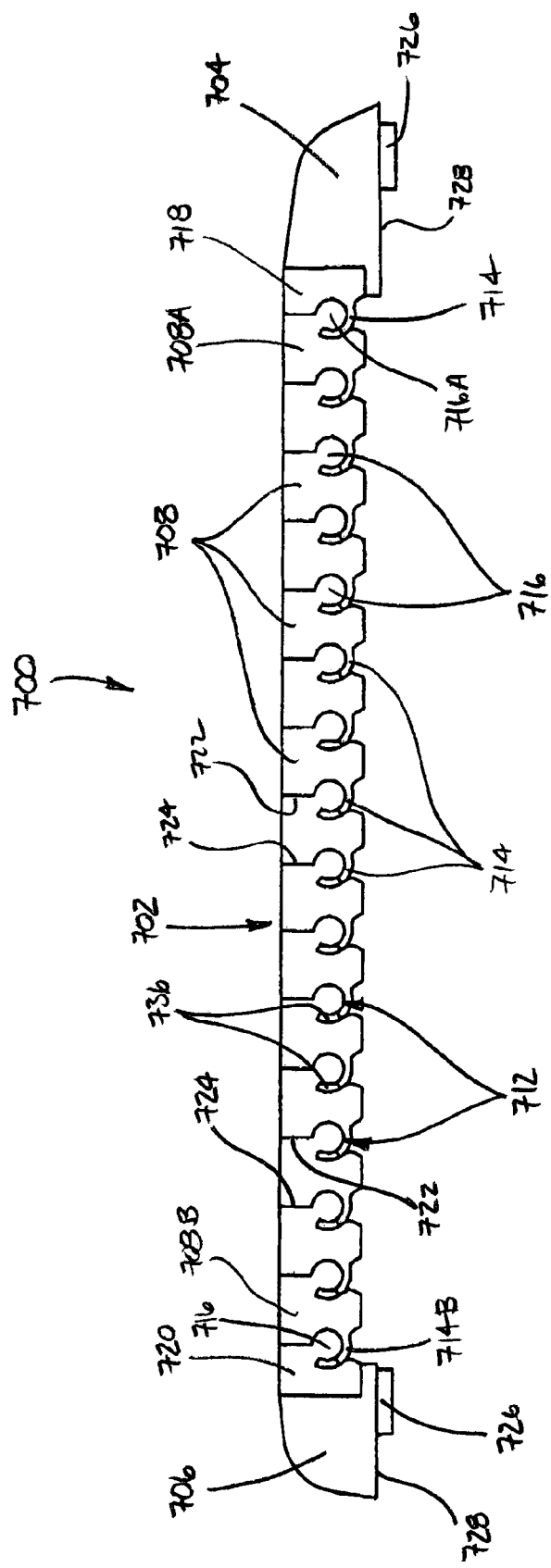
FIG. 13 is a side elevation view of the collapsible weighing scale shown in FIG. 12.
Figure 14:
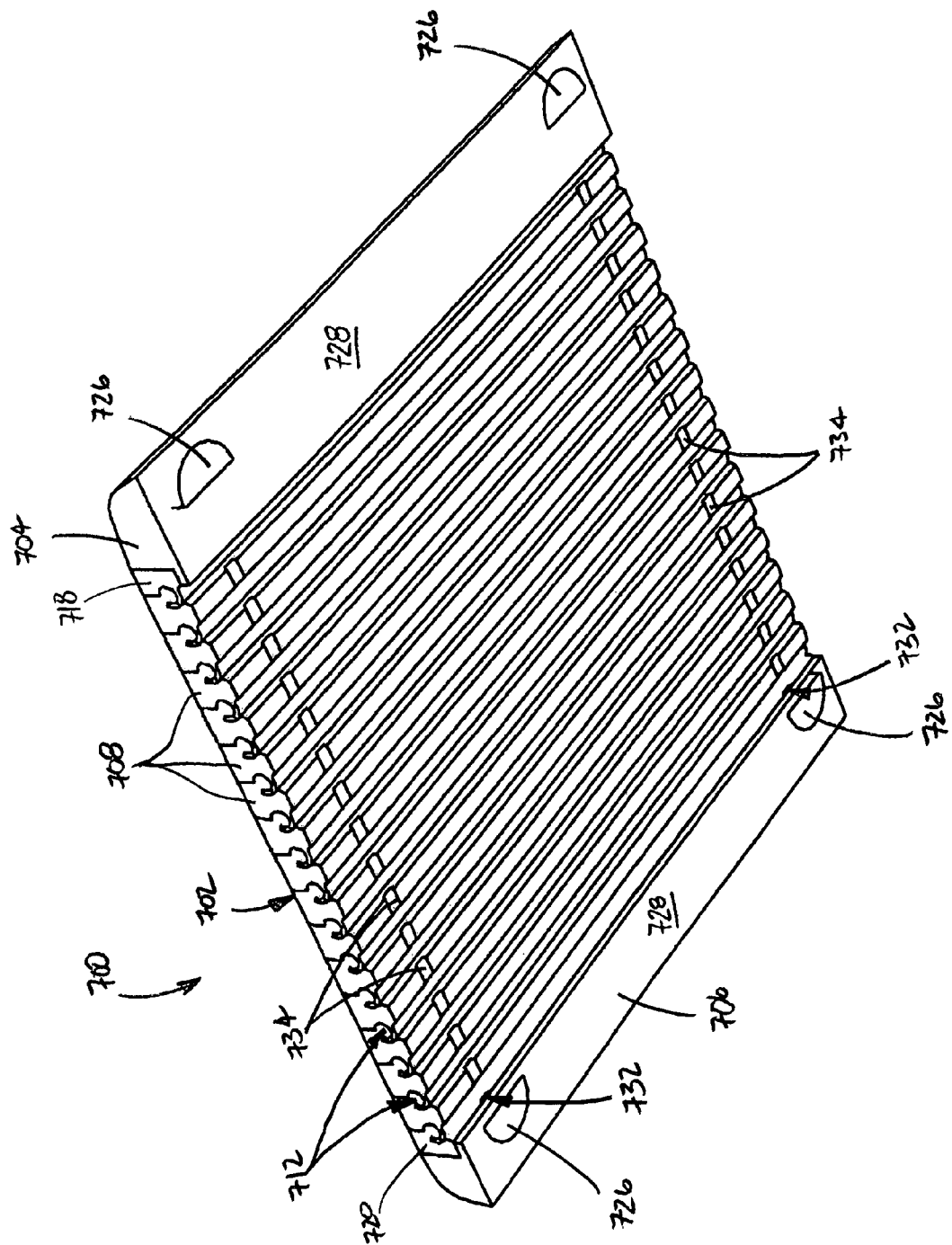
FIG. 14 is a bottom perspective view of the collapsible weighing scale shown in FIG. 12.
Figure 15:
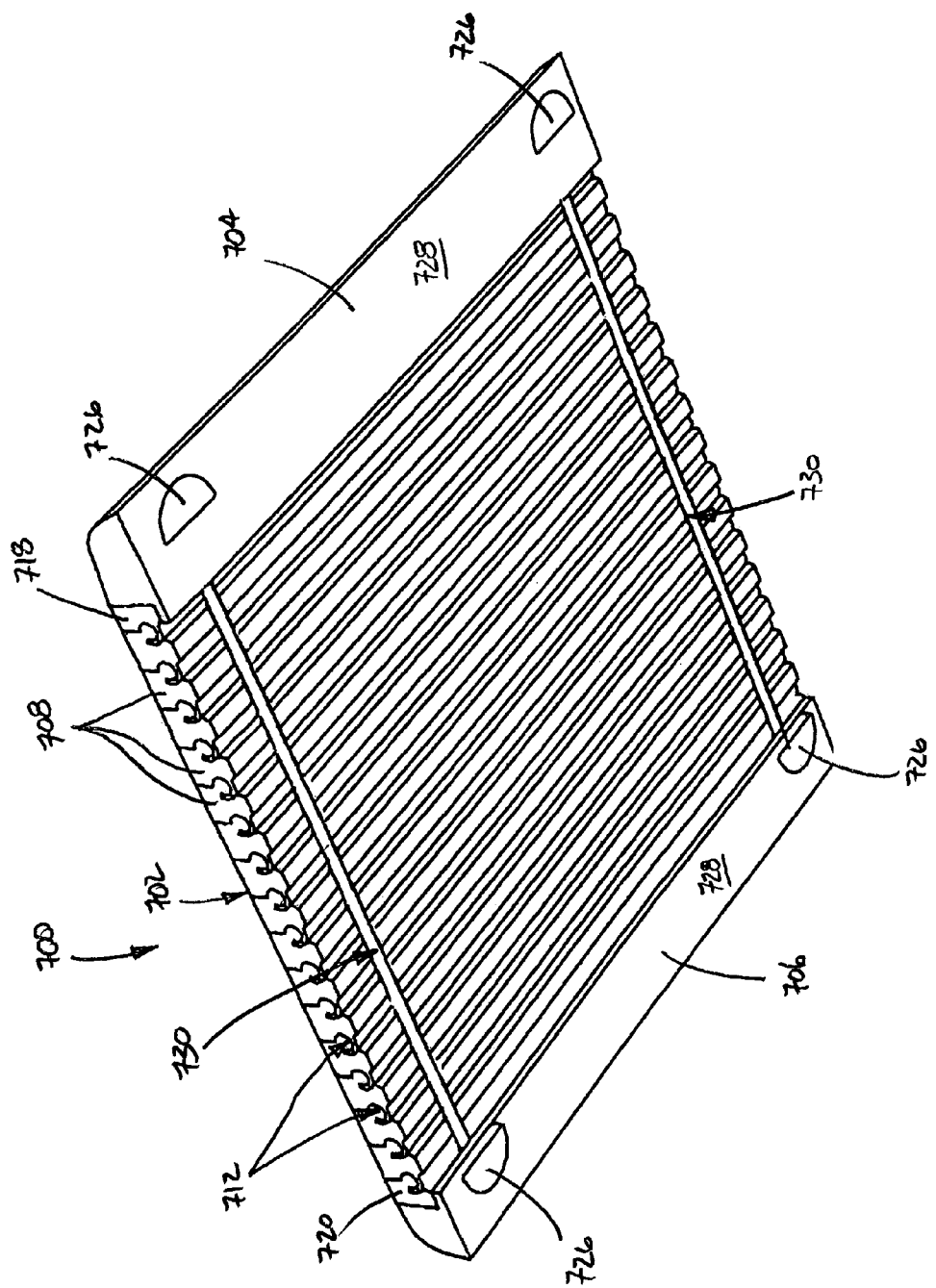
FIG. 15 is the bottom perspective view of the collapsible weighing scale in FIG. 14 shown with optional support bars.

Turning to FIG. 13, each of platform segments 708 is interconnected to the adjacent platform segments by joints 712. Each platform segment 708 includes a socket 714 disposed along a first portion thereof and a cylindrical bead or rail 716 extending along an opposing portion thereof and generally parallel with the socket. It will be appreciated, however, that any suitable feature or configuration for pivotally joining adjacent platform segments can be used without departing from the scope and intent of the present invention. For example, a series of bead segments extending along each platform segment, or a plurality of spherical balls disposed along the platform segments, could be used. Connecting elements 718 and 720 pivotally connect the plurality of platform segments between support members 704 and 706, respectively.

The connecting elements can be secured to the respective support members in any suitable manner, such as by using fasteners and/or adhesives, for example. Alternately, connecting elements 718 and 720 can be integrally formed on the respective support members. Connecting element 718 includes a socket 714 extending along the length thereof generally opposite support member 704. Connecting element 720 includes a generally cylindrical bead or rail 716 extending therealong generally opposite support member 706. As such, a first platform segment 708A is pivotally connected to connecting element 718 by socket 714 of the connecting element receiving rail 716A of platform segment 708A. Socket 714B of the last of the plurality of platform segments 708B is pivotally interconnected to connecting element 720 by socket 714B of the platform segment receiving rail 716 of the connecting element.

In the deployed or extended position shown in FIGS. 12–15, rail 716 of each platform segment 708 is received into a corresponding socket 714 on the next immediately adjacent platform segment. Except, that is, for platform segment 708A for which the rail thereof is received in the socket of connecting element 718. Additionally, rail 716 of connector element 720 is received in socket 714B of platform segment 708B.

Each of platform segments 708 includes side walls 722 and 724 extending longitudinally along the lengths thereof. It will be appreciated from FIG. 13 that side wall 722 extends adjacent rail 716, and side wall 724 extends adjacent socket 714 of each platform segment. As such, in the deployed or extended position, side wall 722 of one platform segment abuts against side wall 724 of the adjacent platform segment preventing further rotation of the joint that extends therebetween. The side walls 722 and 724 are preferably of the same height on all platform segments 708 so as to provide a flat support surface or platform when scale 700 is in its extended position.

It will be appreciated that in this embodiment, platform segments 708 and joints 712 therebetween substantially bear the weight of the person or object situated thereon. The weight is distributed to support members 704 and 706 which are supported on a subjacent surface (not shown) each by one or more feet 726 mounted on a bottom surface 728 thereof. An electronic load sensor (not shown) is typically positioned on each foot 726 or alternatively positioned between each foot 726 and the associated support member. Each load sensor creates an electronic signal that is correlated to the load sensed by its associated foot. Using suitable electronics, known by those skilled in the art, the individual signals from the electronic load sensor of each foot are combined or summed, and the resulting total signal is converted into appropriate units for displaying the total weight sensed by the scale, which is thereafter suitably output, such as on display 710, for example.

It is important that the platform segments and corresponding joints therebetween do not buckle under the weight of the associated object supported thereon, and that the platform segments are not in contact with the subjacent surface that supports feet 726. This would undesirably affect the weight sensed by the load sensors and cause the scale to render an inaccurate reading of the weight of the associated object. It is apparent from FIG. 13 that platform segments 708 and support members 704 and 706 are spaced away from and do not extend as far down as feet 726. To provide additional structural support to scale 700, stabilizing rods 730, shown in FIG. 15, can optionally be used. The stabilizing rods aid in the prevention of buckling of joints 712 under the weight of the associated object or person. The stabilizing rods can be pivotally attached to one of support members 704 and 706 and fold underneath the respective support member such that the stabilizing rods are out of the way when collapsing scale 700. Alternately, the stabilizing rods can be separate and removable from scale 700. As better seen in FIG. 14, holes 732 can be used to receive opposing ends of the stabilizing rods, where removable stabilizing rods are used. Additionally, notches 734 or any other suitable geometric feature can be optionally provided on platform segments 708 to engage the stabilizing rods.

Figure 16:
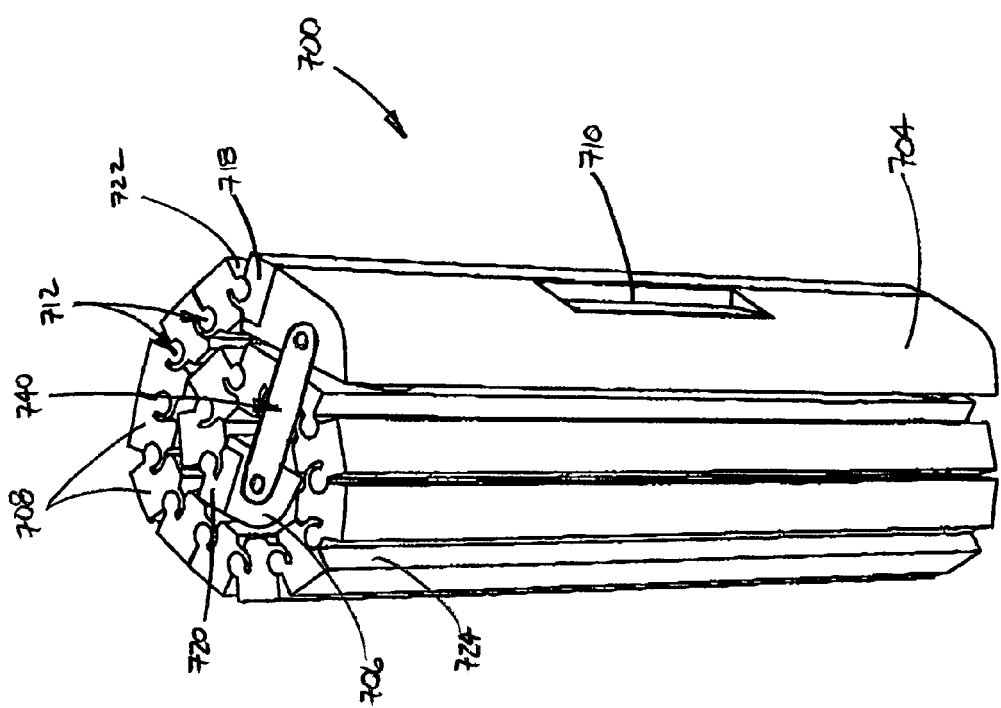
FIG. 16 is a perspective view of the collapsible weighing scale of FIG. 12 shown in a collapsed position.
Figure 17:
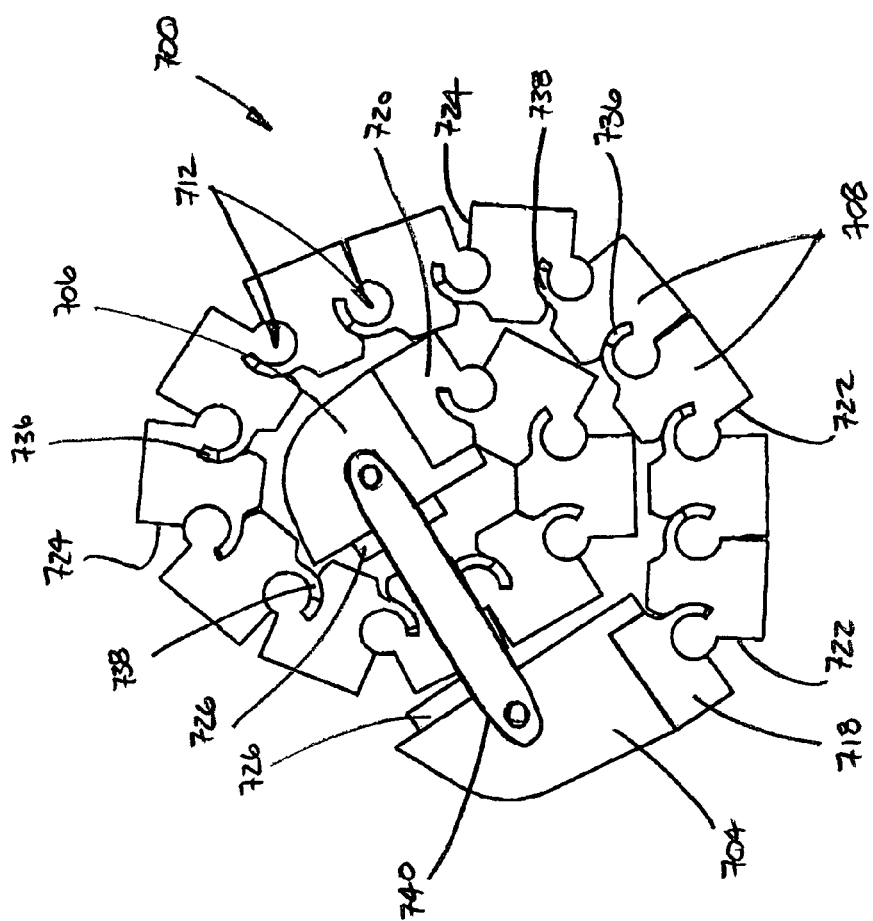
FIG. 17 is an end view of the collapsible weighing scale of FIG. 16.

As shown in FIG. 13, joints 712 include gaps or voids 736. These voids, along with joints 712 allow scale 700 to be rolled up into a collapsed position as shown in FIGS. 16 and 17. Preferably, the joints have a limited degree of movement to prevent over extension of the electronic elements. The range of movement between adjacent platform segments can be limited by the length of an arm portion 738 of socket 714 and the distance that the same can extend into gap 736. Where 738 is fully inserted into gap 736 of joint 712, the two associated platform segments will generally be able to pivot no further. In the collapsed position, scale 700 can also include a securement device, such as a strap 740 that secures the ends of the support members, for example. It will be appreciated, however, that any suitable securement device can be used, including complementary magnets, elastic bands and/or hook and loop fasteners, for example.

While the invention has been described with reference to preferred embodiments and considerable emphasis has been placed herein on the structure and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. Rather, it is intended that the invention be construed as including all such modifications and alterations insofar as they come within the scope of the appended claims and the equivalents thereof.

What is claimed is:

1. A collapsible weighing scale for outputting the full weight of an associated object, said scale comprising:
    a support structure including a first support member and a second support member operatively connected to and displaceable relative to said first support member between a storage condition of said support structure and a use condition of said support structure, wherein said first and second support members are in a first plane in both said storage condition and said use condition;
    a plurality of platform segments mounted to said support structure and including first and second outer platform segments respectively secured on said first and second support members and at least one inner platform segment secured between said first and second outer platform segments, said plurality of platform segments having an extended position in which all of said platform segments are located in said first plane of said first and second support members, and a collapsed position in which said outer platform segments are displaced from said first plane of said first and second support members into a second plane different from said first plane and said at least one inner platform segment is displaced from said first plane into a third plane different from said first and second planes;
    a load sensing apparatus mounted to said support structure, said load sensing apparatus providing an output signal of the full weight of the associated object; and,
    an output device for communicating the full weight of the associated object, said output device being in electrical communication with said load sensing apparatus and receiving said output signal therefrom;
    each of said support members and said platform segments extends in generally transverse relation to the direction in which said support structure extends and collapses.

2. A collapsible weighing scale according to claim 1, wherein said support structure further includes a pair of collapsible support beams pivotally interconnected between said first and second support members.

3. A collapsible weighing scale according to claim 1, wherein said plurality of platform segments are hingedly interconnected.

4. A collapsible weighing scale for outputting the full weight of an associated object, said scale comprising:
    a support structure including a longitudinal axis and a base member extending along the longitudinal axis, said support structure including a plurality of support members pivotally mounted on said base member with at least one of said plurality of support members being secured along each of a pair of opposed sides of said base member, said plurality of support members being displaceable between extended and collapsed positions, in said collapsed position said support members extending in generally aligned relation to said base member and in said extended position said support members extending in generally transverse relation to said base member with at least one of said support members projecting from each of said opposing sides of said base member;
    a plurality of platform segments connected to said support structure and having respective collapsed and extended positions corresponding to said collapsed and extended positions of said support structure;
    a load sensing apparatus mounted to said support structure, said load sensing apparatus providing an output signal of the full weight of the associated object; and,
    an output device for communicating the full weight of the associated object, said output device being in electrical communication with said load sensing apparatus and receiving said output signal therefrom.

5. A collapsible weighing scale according to claim 4, wherein said plurality of platform segments is connected by a flexible membrane.

6. A collapsible weighing scale according to claim 4, wherein said plurality of platform segments comprise elongated rods.

7. A collapsible weighing scale according to claim 5, wherein said plurality of support members includes a first pair of support members and a second pair of support members.

8. A collapsible weighing scale according to claim 7, wherein each support member of said first pair of support members includes a plurality of gear teeth, said plurality of gear teeth of one of said support members interengaging said plurality of gear teeth of the other support member such that displacement of one support member of a pair of support members causes displacement of the other support member of said pair of support members between a collapsed position and an extended position.

9. A collapsible weighing scale according to claim 4, wherein said support structure includes a linkage arrangement interconnecting said plurality of support members such that displacement of one support member causes displacement of another support member.

10. A collapsible weighing scale according to claim 9, wherein said linkage arrangement includes a pivot member pivotably supported on said base member and a first and a second linkage member, each respectively extending between said pivot member and different ones of said plurality of support members.

11. A collapsible weighing scale according to claim 4, wherein said plurality of platform segments extend longitudinally along said base member and are supported on said support members in said extended position.

12. A collapsible weighing scale for outputting the full weight of an associated object, said scale comprising:
   a support structure displaceable between a collapsed position and an extended position, and including a base member having a longitudinally extending centerline defining opposing sides of said base member, a plurality of support members pivotally mounted on said base member with at least one of said plurality of support members mounted along each of said opposing sides of said base member, an actuating member, and a linkage arrangement interconnecting said actuating member and at least one of said plurality of support members, wherein in said collapsed position of said support structure said support members extend in generally aligned relation to said base member and in said extended position of said support structure said support members extend in generally transverse relation to said base member;
   a plurality of platform segments mounted on said support structure and having respective collapsed and extended positions corresponding to said collapsed and extended positions of said support structure;
   a load sensing apparatus supported on the said supporting structure, said load sensing apparatus providing an output signal of the full weight of the associated object;
   an output device for communicating the full weight of the associated object, said output device in electrical communication with said load sensing apparatus and receives said output signal therefrom.

13. A collapsible weighing scale according to claim 12, wherein said plurality of support members include a first and a second support member forming a first pair of support members and a third and a fourth support member forming a second pair of support members, wherein said first and said second support members and said third and said fourth support members respectively interengage one another such that displacement of one of said support members of said first and said second pairs of support members causes displacement of the other respective support member of said first and said second pairs of support members.

14. A collapsible weighing scale according to claim 13, wherein said first support member, said second support member, said third support member and said fourth support member each include a plurality of gear teeth.

15. A collapsible weighing scale according to claim 14, wherein said plurality of gear teeth of said first support member interengage said plurality of gear teeth of said second support member, and said plurality of gear teeth of said third support member interengage said plurality of gear teeth of said fourth support member.

16. A collapsible weighing scale according to claim 13, wherein said linkage arrangement includes a pivot member pivotally supported on said base member and a first and a second linkage member respectively interconnecting said pivot member and said first and said second pair of support members.

17. A collapsible weighing scale according to claim 13, wherein said plurality of platform segments extend longitudinally along said base member and are supported on said support members in said extended position.

18. A collapsible weighing scale according to claim 13, wherein said plurality of platform segments is connected by a flexible membrane.

19. A collapsible weighing scale according to claim 13, wherein said plurality of platform segments comprise elongated rods.

20. A collapsible weighing scale for outputting the full weight of an associated object, said scale comprising:
   a support structure including a first support member, a second support member displaceable from said first support member and a plurality of platform segments interconnected with one another and supported by said first and second support members in a deployed orientation thereof, each of said platform segments is pivotally interconnected to an adjacent platform segment by a pivotal joint, and each platform segment includes a male joint portion and a female joint portion;
   a load sensing apparatus mounted on said support structure, said load sensing apparatus providing an output signal of the full weight of the associated object; and,
   an output device for communicating the full weight of the associated object, said output device being in electrical communication with said load sensing apparatus and receiving said output signal therefrom.

21. A collapsible weighing scale according to claim 20, wherein said male joint portion comprises a cylindrical rail.

22. A collapsible weighing scale according to claim 20, wherein each of said platform segments has a top, a bottom and opposing sides, and said male and female joint portions are each disposed along a different one of said opposing sides.

23. A collapsible weighing scale according to claim 22, wherein each of said sides of said platform segments includes a side wall portion that the contacts said side wall portion of adjacent platform segments in said deployed orientation thereby restricting the pivoting motion of said pivotal joints.

24. A collapsible weighing scale according to claim 23, wherein said side wall portion is adjacent said top and each of said male and female joint portions is positioned below said respective side wall portion on each of said platform segments.

25. A collapsible weighing scale according to claim 20, wherein said first support member includes one of a male joint portion and a female joint portion, and said second support member includes the other of said male joint portion and said female joint portion.

26. A collapsible weighing scale according to claim 25, wherein each of said support segments has a top, a bottom, and a side, and said respective joint portion is disposed along said side.

27. A collapsible weighing scale according to claim 26, wherein said side of each of said support segments includes a side wall portion that contacts a corresponding side wall portion on an adjacent platform segment thereby restricting the pivoting motion of said pivotal joint.

28. A collapsible weighing scale according to claim 27, wherein said joint portion of each of said support segments is below said respective side wall portion.

29. A collapsible weighing scale according to claim 20, further comprising a stabilizing bar disposed between said first and second support members to further support the weight of the associated object.

30. A collapsible weighing scale comprising:
   a support structure;
   a platform on said support structure displaceable between a deployed configuration and a storage configuration, said platform including a membrane and a plurality of platform segments, said membrane including a plurality of pockets receiving said platform segments;

a load sensor operatively associated with one of said support structure and said platform to sense the full weight of an associated object positioned on the scale; and a display, connected to said load sensor, for converting the weight sensed by said load sensor to human readable form.

31. The scale of claim 30, wherein each pocket of said plurality of pockets holds a respective platform segment.

32. The scale of claim 30, wherein said platform segments comprise elongated rods.

33. The scale of claim 30, wherein said plurality of pockets are longitudinally aligned.

34. The scale of claim 33, wherein a longitudinal axis of said platform is aligned with respective longitudinal axes of said plurality of pockets.

35. The scale of claim 30, wherein said support structure includes a first support member which is moveable relative to said platform between a deployed configuration and storage configuration.

36. The scale of claim 35, wherein said support structure includes a second support member which is moveable relative to said platform between a deployed configuration and a storage configuration.

37. The scale of claim 36, wherein said first support member extends along a first side of said platform and said second support member extends along a second side of said platform.

38. The scale of claim 36, wherein said first support member extends outwardly in a first direction in said deployed configuration and said second support member extends outwardly in an opposing second direction in said deployed configuration.

39. The scale of claim 30, wherein said support structure includes a central base member and said membrane includes a central portion supported on said base member, a first outer side portion extending from said central portion in a first direction and a second outer side portion extending from said central portion in an opposing second direction.

* * * * *